United States Patent Office 3,357,867
Patented Dec. 12, 1967

3,357,867
PROCESS FOR MANUFACTURING CAPACITOR GRADE FOIL
Gerard J. Villani, Newton, Mass., assignor to National Research Corporation, Cambridge, Mass., a corporation of Massachusetts
Filed May 13, 1965, Ser. No. 455,454
4 Claims. (Cl. 148—4)

ABSTRACT OF THE DISCLOSURE

Capacitor grade foil is made by depositing on a foil of a first valve metal, a second valve, metal and diffusing the second valve metal into the foil while under a partial pressure of inert gas to form a surface layer of alloy in the foil and then evaporating the second valve metal to create a porous foil surface.

---

This application is in part a continuation of my copending application Ser. No. 429,846, filed Feb. 2, 1965 now abandoned. The present invention relates to the production of porous sheets of tantalum, niobium and other "valve metals" particularly useful for the production of anodes in electrolytic capacitors.

In the formation of an electrolytic capacitor from a sheet of tantalum, titanium or other valve metal, the capacitance of the resulting capacitor is determined by the formula:

$$C = 8.85 \times 10^{-14} \frac{\epsilon A}{d}$$

where $C$ = capacitance, farads
$\epsilon$ = dielectric constant of medium separating plates
$A$ = plate area, cm.$^2$
$d$ = plate separation, cm.

In an electrolytic capacitor, the oxide layer produced on the anode by electrolytic anodization is the dielectric separating the plates; $d$ refers to the thickness of this layer and $\epsilon$ to its dielectric constant. Under a given set of formation conditions, the only remaining variable which can have a significant effect on capacitance is A, the plate area, i.e. the area of the anodized foil.

Foil anodes made in the past have had their available surface area increased by a number of different processes which result in increase of the true area. This increase is normally expressed as "surface enhancement factor," which is the ratio of the true area to the apparent geometric area. The true area can be increased by etching the surface and/or creating interconnected interal pores. A widely-used method of increasing the true area has been the use of electrochemical or acid etching. However, it has been found that electrochemical and other etch techniques normally employed by the prior art on valve metal foil anodes has not been effective to provide a surface enhancement factor which remains high when a high formation voltage is employed, that is, when a high voltage capacitor is produced. This arises from the fact that, in order to achieve high voltage capacitance, the oxide film must be relatively thick. However, the electrochemical and other etch techniques of the prior art provide very small etch pits which have a dimension less than twice the thickness of the relatively thick high voltage oxide film. Accordingly, these small etch pits are completely blocked by the oxide film and the large surface area of the pits is no longer effective. Thus, electrochemically-etched foils are characterized by a surface enhancement factor (often referred to as the etch ratio) which decreases rapidly with increasing formation voltage, and usually does not exceed 1.5 to 2.0 when formed to 200 volts.

A recent development by Kolski (Journal of the Electrochemical Society, vol. 112, No. 3, March 1965, pp. 272–279) has attempted to overcome the defects of the prior art electrochemical etch techniques for providing tantalum and other valve metal foils with a high surface enhancement factor. This has been accomplished by Kolski with respect to tantalum and niobium foils by initially fabricating the foils from alloys of either of such metals with titanium. After the alloy foil has been fabricated by normal rolling techniques, it is, according to the Kolski technique, heated to an elevated temperature for a long period of time in a vacuum system to evaporate essentially all of the titanium from the tantalum or niobium foil to leave a highly porous structure. While this has certain distinct advantages over the prior etching techniques, e.g. large interconnected pores both on the sorface and internally, it still retains certain disadvantages, among the most striking of which are the long times and high temperatures of treatment necessary to remove substantially quantities of titanium from the alloy which makes the process impractical for continuous operation. There is the additional disadvantage of inability to remove titanium completely from interior sections of the alloy foil. Accordingly, after heat treatment, the alloy sheet, when cut to form small anodes, must be reheated to assure essential freedom of titanium at the freshly-exposed surface. In addition, the Kolski process is limited to alloys which can be fabricated into thin sheets.

It is a principal object of the present invention to provide a technique for making tantalum and other valve metal foils having a high surface enhancement factor without the disadvantages inherent in the prior art methods discussed above.

Another object of the invention is to provide an improved tantalum foil having a high surface enhancement factor which can be formed to high voltages without substantial degradation of its surface enhancement factor.

Still another object of the invention is to provide an improved product of the above type involving relatively simple processing techniques.

These and other objects of the invention will in part be obvious and will in part appear hereinafter.

The invention accordingly comprises the process involving the several steps and the relation and the order of one or more of such steps with respect to each of the others and the apparatus possessing the features, properties, and the relation of components which are described in the following detailed disclosure and the scope of the application of which will be indicated in the claims.

For a fuller understanding of the nature and objects of the invention, reference should be had to the following detailed description taken in connection with the accompanying drawing wherein.

In practicing the present invention in its broadest sense, a foil of a valve metal is coated with a layer of another valve metal having a lower melting point and higher vapor pressure than the first valve metal. The product is then heat-treated so as to (a) diffuse the second valve metal into the surface of the first valve metal foil and also to (b) evaporate the second valve metal from the surface of the foil, the evaporation being continued until essentially all of the second valve metal has been removed from the foil.

Figure 1:
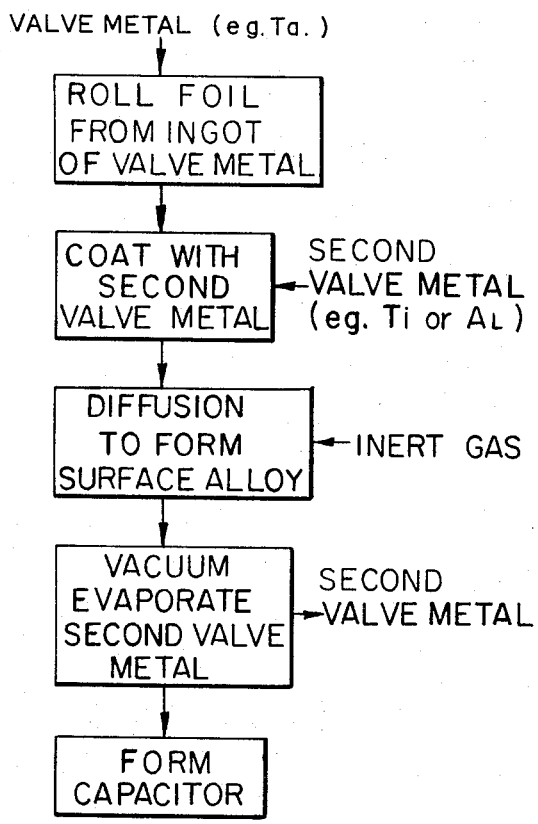
FIG. 1 is a diagrammatic schematic flow sheet illustrating the invention.

For convenience of illustration, the invention will be initially described in connection with the use of tantalum as the first valve metal in the form of a foil and having a coating of titanium as the second valve metal. The basic process will best be understood by reference to the drawings, particularly in FIG. 1 showing a flow diagram of the process. In the first step of the process, a tantalum ingot is reduced to tantalum foil or sheet by techniques well known in the art. In the second step, the tantalum foil is coated with titanium, preferably by vacuum evaporation of the titanium and the deposition of the titanium on the tantalum foil. Thereafter the composite structure is heated in a furnace under a partial pressure of an inert gas, the temperature preferably being gradually raised over an extended period of time. During the first part of the heat treatment the diffusion of titanium into the tantalum occurs to form the alloy. Thereafter the furnace is evacuated and the alloyed foil is heated to a rather high temperature on the order of 1800° C and above to provide evaporation of titanium from the foil. The diffusion and evaporation steps are preferably (but not necessarily) part of the same heating cycle. This diffusion and evaporation provides for an expanded, roughened, surface with interconnected internal pores which has a greatly increased surface area. The pores (or pits) are about 1 to 6 microns in diameter and on the order of 3 to 6 microns deep. Such a roughened, open-pore structure is particularly suited for production of high voltage capacitors by the formation of a relatively thick tantalum oxide film on the porous surface.

In order that the invention may be more clearly understood, there is set forth below one specific preferred example of the present invention.

*Example 1*

A .001 inch thick strip of tantalum was coated in a vacuum chamber with a .0005 inch thick coating of titanium on one face of the strip. The coated strip was indirectly heated by radiation from a hot tantalum heater element from ambient (30° C.) to about 1120° C. and then to 2080° C. at an average rate of 25° C. per minute. The heating was initially carried out under a partial pressure of argon at 250 torr. When the temperature of the coated foil reached 1800° C., the argon was pumped out, the furnace pressure falling to less than $10^{-3}$ torr, and the heating was continued until the foil reached 2080° C. The strip was then cooled to below 600° C. in a few seconds and to room temperature in about 10 minutes. Microscopic examination of the foil showed a fine scalloped surface with porosity extending throughout the foil. The total foil thickness was 1 mil after heat treatment. A drawing based on a photomicrograph of the foil cross-section is shown in FIG. 2.

A strip, cut from the foil, was anodized in a solution of .01% $H_3PO_4$ at 92° C. at a constant current to a formation voltage of 200 volts. It was tested in an electrolyte of 10% $H_3PO_4$ for capacitance. The above percentages are based on weight. The capacitance of the foil was 452 microfarad-volts per square inch of apparent geometric area (to give a surface enhancement factor of about 6.5). Under identical test conditions, unetched tantalum foil has a capacitance of 70 microfarad-volts per square inch of apparent geometric area. The dissipation factor of the strip was 2.8%.

Figure 2:
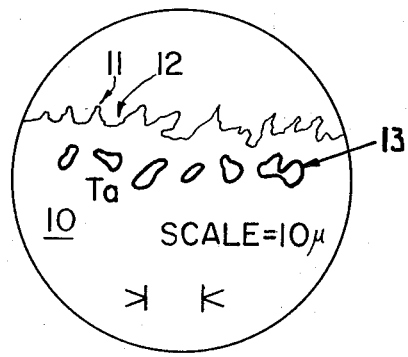
FIG. 2 is a representation of a photomicrograph of a surface section of a coil made in accordance with the present invention.

The photomicrograph of FIG. 2 illustrates diagrammatically the large increase in effective surface area obtained by practicing the present invention. In this case, the tantalum foil substrate 10 has hills 11 and valleys 12 on its surface and interconnected pores 13 within the foil, with the pores or pits being substantially in excess of 1 micron in diameter and generally being 3 to 6 microns deep. For convenience, a 10-micron scale is shown in FIG. 2. Since the tantalum oxide film thickness, necessary to provide a high voltage capacitor (e.g. >200 volts), is only on the order of .5 micron, such an oxide film will not appreciably plug the surface pores and will not degrade the surface enhancement factor.

*Example 2*

The procedure of Example 1 was modified by evaporating aluminum instead of titanium onto the tantalum foil. The other treatment steps of time, pressure, and temperature were as set forth in Example 1. When the resulting aluminum-etched tantalum foil was anodized to 200 v. as described in Example 1, a capacitance of 283 $\mu$fv./in.$^2$ was measured (giving a surface enhancement factor of 4.0). When the anodizing was continued to 270 v. the surface enhancement factor increased slightly to 4.1. This anodized foil had a breakdown voltage in excess of 500 v.

*Example 3 (control)*

This was similar to Example 2 except that the initial heating of the aluminum-coated tantalum strip was carried out under a vacuum of $10^{-4}$ torr rather than under 250 torr of argon. In this case, the surface enhancement factor was only about 2 when the resultant foil was formed to 200 v., indicating that too much aluminum had evaporated before the high "etch" temperatures were reached.

A comparison of Examples 2 and 3 is believed to demonstrate the importance of diffusion of the aluminum into the tantalum before appreciable evaporation of aluminum takes place. The high partial pressure of argon sufficiently suppressed evaporation of the aluminum during the time of increasing temperature that substantial diffusion of aluminum into the tantalum was achieved.

The diffusion of the second valve metal can be achieved during the actual coating step in those cases where the coating operation either heats the base valve metal or the base valve metal is separately heated prior to and during the coating operation. The diffusion of the second valve metal is preferably achieved under a partial pressure of an inert gas which is higher than the vapor pressure of the second valve metal. This diffusion step under a higher pressure of an inert gas permits a high diffusion rate while suppressing the evaporation rate of the second valve metal during the high temperature treatment necessary to obtain such a high diffusion rate. In most cases, it is preferred to carry out the evaporation of the second valve metal under subatmospheric pressure since such conditions provide a higher evaporation rate. In order to achieve commercially interesting rates, it is preferred that the evaporation be carried out at an elevated temperature corresponding to a vapor pressure of the second valve metal which is higher than the prevailing pressure in the evaporation zone.

While a few preferred embodiments of the invention have been described in detail above wherein tantalum is the base valve metal and titanium or aluminum is the second valve metal coated thereon, numerous other combinations of valve metals may be utilized. For example, the base foil may be any of the refractory valve metals, such as niobium, tungsten, molybdenum, hafnium, zirconium or even titanium, while the second valve metal can be any of the lesser refractory valve metals, such as bismuth, antimony, magnesium, silicon, tin and chromium. As will be apparent to one skilled in the art, when the base valve metal is very refractory, such as tantalum, any less refractory valve metal, such as titanium, zirconium or hafnium, can be employed as the second valve metal, the only requirement being that the second valve metal have a lower melting point and higher vapor pressure than the first valve metal.

While vapor deposition of the second valve metal on a foil of the first valve metal is a preferred form of practicing the invention, numerous other coating techniques can be utilized. For example, the second valve metal may be applied by cladding, dipping, spraying, chemical reduction, thermal decomposition and other known coating techniques, the principal requirement being that the coating technique be one which permits reasonable control of coating thickness with the production of a relatively pure metal coating so as not to contaminate the base valve metal.

Since certain changes can be made in the above process and product without departing from the scope of the invention herein involved, it is intended that all matter contained in the above description shall be interpreted as illustrative and not in a limiting sense.

What is claimed is:

1. A method of producing foil for electrolytic capacitor anodes and the like comprising the steps of forming a foil of tantalum, depositing on said foil a coating of aluminum, heating the coated foil under a partial pressure of an inert gas to diffuse the aluminum into the tantalum to form a surface alloy and thereafter heating the foil to evaporate the second metal from the foil to leave a porous foil, the heating for evaporation being carried out in a vacuum zone and at a temperature below the melting point of the tantalum and above a temperature corresponding to a vapor pressure of aluminum higher than the prevailing pressure in the vacuum zone.

2. The method of claim 1 wherein the aluminum coating is applied to the foil by vacuum evaporation and the aluminum evaporation from the foil is accomplished at a temperature above 1800° C.

3. A method of producing foil for electrolytic capacitor anodes and the like comprising the steps of depositing on a tantalum foil a coating of aluminum, gradually heating the coated foil under a partial pressure of an inert gas to diffuse the aluminum into the tantalum to form a surface alloy, the partial pressure of the inert gas being greater than the partial pressure of aluminum at the diffusion temperature, and thereafter heating the surface-alloyed foil to evaporate the aluminum from the foil to leave a porous surface layer in the foil, the heating for evaporation being carried out in a vacuum zone and at a temperature below the melting point of the tantalum and above a temperature below the melting point of the tantalum and above a temperature corresponding to a vapor pressure of the aluminum higher than the prevailing pressure in the vacuum zone.

4. The method of claim 2 wherein the aluminum coated tantalum foil is heated under a partial pressure of inert gas of 250 torr to 1800° C. for said diffusion step and then heated from 1800° C. to 2080° C. under vacuum.

References Cited

UNITED STATES PATENTS

| | | | |
|---|---|---|---|
| 2,447,980 | 8/1948 | Hensel | 148—13 X |
| 3,203,793 | 8/1965 | Hand | 148—13 X |

CHARLES N. LOVELL, *Primary Examiner.*